United States Patent
Krammer et al.

(10) Patent No.: US 9,840,152 B2
(45) Date of Patent: Dec. 12, 2017

(54) APPARATUS FOR INDUCTIVE POWER TRANSMISSION

(71) Applicant: Bayerische Motoren Werke Aktiengesellschaft, Munich (DE)

(72) Inventors: Josef Krammer, Holzkirchen (DE); Jens Berger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 47 days.

(21) Appl. No.: 14/500,574

(22) Filed: Sep. 29, 2014

(65) Prior Publication Data

US 2015/0015199 A1 Jan. 15, 2015

Related U.S. Application Data

(63) Continuation of application No. PCT/EP2013/055757, filed on Mar. 20, 2013.

(30) Foreign Application Priority Data

Mar. 30, 2012 (DE) .................. 10 2012 205 283

(51) Int. Cl.
| | | |
|---|---|---|
| H02J 7/00 | (2006.01) | |
| B60L 11/18 | (2006.01) | |
| H02J 5/00 | (2016.01) | |
| B60L 3/00 | (2006.01) | |

(52) U.S. Cl.
CPC ........... B60L 11/182 (2013.01); B60L 3/0069 (2013.01); H02J 5/005 (2013.01); B60L 2240/36 (2013.01); B60L 2270/147 (2013.01); Y02T 10/7005 (2013.01); Y02T 10/7072 (2013.01); Y02T 90/122 (2013.01); Y02T 90/14 (2013.01)

(58) Field of Classification Search
CPC ........ H02J 7/025; H01F 38/14; Y02T 90/122; B60L 11/182; Y02E 60/12
USPC .......................................... 320/108
See application file for complete search history.

(56) References Cited

U.S. PATENT DOCUMENTS

| | | | |
|---|---|---|---|
| 2,550,688 A | 5/1951 | Gossick | |
| 5,821,731 A * | 10/1998 | Kuki | B60L 11/1805 320/108 |
| 2004/0107781 A1 * | 6/2004 | Asaumi | G01L 3/102 73/862.333 |
| 2005/0189939 A1 * | 9/2005 | Obama | G07D 7/04 324/232 |
| 2007/0126420 A1 | 6/2007 | Graze et al. | |
| 2010/0052667 A1 * | 3/2010 | Kohama | G01N 27/9046 324/239 |
| 2010/0124792 A1 * | 5/2010 | Iravani | B24B 37/013 438/17 |
| 2012/0049850 A1 | 3/2012 | Reime | |
| 2012/0181875 A1 | 7/2012 | Wechlin et al. | |
| 2013/0076296 A1 * | 3/2013 | Ushiroda | B60L 3/12 320/101 |
| 2013/0099592 A1 | 4/2013 | Abe | |

FOREIGN PATENT DOCUMENTS

| | | |
|---|---|---|
| CN | 103098344 A | 5/2013 |
| DE | 44 23 661 A1 | 1/1996 |
| DE | 20 2009 009 693 U1 | 12/2010 |
| DE | 10 2009 033 237 A1 | 1/2011 |
| EP | 0 353 035 A2 | 1/1990 |
| FR | 2 947 114 A1 | 12/2010 |
| JP | 6-273535 A | 9/1994 |
| JP | 2008-288889 A | 11/2008 |
| JP | 2012-16125 A | 1/2012 |
| WO | WO 2010/133328 A1 | 11/2010 |
| WO | WO 2012/165244 A1 | 12/2012 |

OTHER PUBLICATIONS

International Search Report dated Sep. 3, 2013 (Three (3) pages).
German Search Report dated Feb. 18, 2013, with Statement of Relevancy (Six (6) pages).
Chinese Office Action issued in Chinese counterpart application No. 201380025895.8 dated Jan. 29, 2016, with English translation (Fourteen (14) pages).

* cited by examiner

*Primary Examiner* — Arun Williams
(74) *Attorney, Agent, or Firm* — Crowell & Moring LLP

(57) ABSTRACT

Apparatus for inductively transmitting power, which apparatus comprises a primary unit with a primary coil and a secondary unit with a secondary coil, and in which the primary coil induces a magnetic transmission field in a transmission area between the primary unit and the secondary unit, and which has an even number of detector coil elements which are wound in opposite directions in pairs and form a detector pair.

17 Claims, 3 Drawing Sheets

APPARATUS FOR INDUCTIVE POWER TRANSMISSION

CROSS REFERENCE TO RELATED APPLICATIONS

This application is a continuation of PCT international Application No. PCT/EP2013/055757, filed Mar. 20, 2013, which claims priority under 35 U.S.C. §119 from German Patent Application No. 10 2012 205 283.6, filed Mar. 30, 2012, the entire disclosures of which are herein expressly incorporated by reference.

BACKGROUND AND SUMMARY OF THE INVENTION

The invention relates to an apparatus for inductively transmitting power, which apparatus comprises a primary unit with a primary coil and a secondary unit with a secondary coil and in which the primary coil generates a magnetic transmission field in a transmission area between the primary unit and the secondary unit.

Inductive power transmission systems are known from the prior art. For example, the document FR 2 947 114 A1 describes an inductive charger for a vehicle for charging an electrical, energy store of the vehicle. The inductive charger consists of a ground unit with a primary coil and a vehicle unit with a secondary coil. The distance between the two coils is approximately 0.1-0.2 m.

An inductive charger for an electric vehicle is designed to transmit power in the range of several kilowatts.

An object of the invention is to describe an improved apparatus for transmitting energy.

This object is achieved by means of an apparatus according to claim 1. Advantageous embodiments and developments of the invention emerge from the dependent claims.

According to the invention, the apparatus has an even number of detector coil elements, wherein the detector coil elements being wound in opposite directions in pairs and forming a detector pair for detecting an induction voltage.

Within the scope of this disclosure, "wound in opposite directions" means that, if the detector pair is permeated with a homogeneous, ideal magnetic field, a voltage is respectively induced in the two detector coil elements and these two voltages have opposite polarity.

According to another variant of the invention, the detector pairs are electrically connected to one another in at least one series circuit, the at least one series circuit forms at least one detector unit, at least one measuring means for measuring an induction voltage at the detector unit is assigned to the at least one detector unit, and the at least one detector unit can be introduced or has been introduced into the transmission area.

The voltages induced with opposite polarity in a detector coil pair are connected in series. Consequently, the voltages are at least partially compensated for over the entire detector coil pair. If the two detector coil elements are structurally identical apart from the winding in opposite directions and if the permeating magnetic field is homogeneous, the total voltage induced by the detector coil pair is zero. This also applies to a plurality of detector coil pairs which are again connected in series with one another and form a detector unit.

It is particularly advantageous if the at least one detector unit is de-energized or the induction voltage is low in the case of a homogeneous transmission field, and the induction voltage is increased at the at least one detector unit in the case of an inhomogeneous transmission field.

If the magnetic field permeating the detector pair is inhomogeneous, the total voltage induced by the detector pair or by a plurality of detector pairs differs from zero. If the further detector pairs of the detector unit are also permeated by a homogeneous field, the total voltage induced by the detector unit likewise differs from zero. This makes it possible to determine inhomogeneities of a magnetic field which is homogeneous per se. The apparatus preferably has a plurality of detector units in the transmission area, which detector units cover the entire transmission area in a manner perpendicular to the orientation of the transmission field.

According to another variant of the invention, the at least one detector unit can be moved within a movement range perpendicular to the orientation of the transmission field in the transmission area, the movement range covering the transmission area.

The transmission field can therefore be scanned for local inhomogeneities using the detector unit.

In this case, an increased induction voltage of a detector unit is sufficient to determine a local inhomogeneity in the transmission field.

It is particularly advantageous if the spatial extent of a detector coil element is adjustable.

If a local inhomogeneity of the transmission field assumes approximately the magnitude of the spatial extent of a detector coil element instead of the detector unit, the induction voltage of the relevant detector pair is particularly pronounced. This means that the detector unit is particularly sensitive in this case. The sensitivity of the detector unit can therefore be optimized with respect to the magnitude of the spatial extent of the local inhomogeneity.

A system having the apparatus and having a vehicle in order to inductively transmit power to the vehicle is preferred, the secondary unit being included in the vehicle and being situated in the region of the underbody of the vehicle, the primary unit being situated outside the vehicle, and the at least one detector unit being included in the primary unit or the secondary unit.

Metal objects situated in the transmission area can be detected using the detector unit while transmitting power to the vehicle.

This means that high magnetic field strengths prevail in the space between the coils.

The invention is based on the considerations explained below:

With respect to inductive systems for transmitting power, for example for charging a vehicle with an electrified drive train, there are currently no systems which detect metal objects in the transmission path in a cost-effective and reliable manner. Optical systems, for instance an infrared camera, can be easily contaminated and detect heating of the metal object only if the metal object is not covered by a neutral body. Ultrasound systems with suitable dimensions detect all objects which are sufficiently large in relation to a vehicle. Small or flat Objects (for example coins) are not detected. They even reduce the availability under certain circumstances since non-metal objects are possibly also detected as metal objects. A conventional metal detector, as known from geology for instance, suffers from interference from the magnetic and metal objects in the system and from the very strong transmission field when charging an electric vehicle, for instance, and should therefore be integrated in a complicated manner.

When using a conventional metal detector, it is necessary to generate a detection magnetic field in addition to the magnetic field which transmits the energy. This requires additional effort. This field does not follow the geometry of the transmission field. Therefore, there is insufficient coverage of the monitored area with the danger area.

It is therefore proposed to use the existing energy transmission field as excitation. Detection is carried out using a special configuration of the sensor coils and adapted evaluation, of the signals. The method is particularly suitable for parts which are very small in relation to a vehicle, for example a coin. Very large metal foreign objects can be detected via a changed energy transmission behavior.

Such a system is also robust and reliable.

One preferred exemplary embodiment of the invention is described below using the accompanying drawings. Further details, preferred embodiments and developments of the invention emerge from the drawings.

DETAILED DESCRIPTION OF THE DRAWINGS

Figure 1:
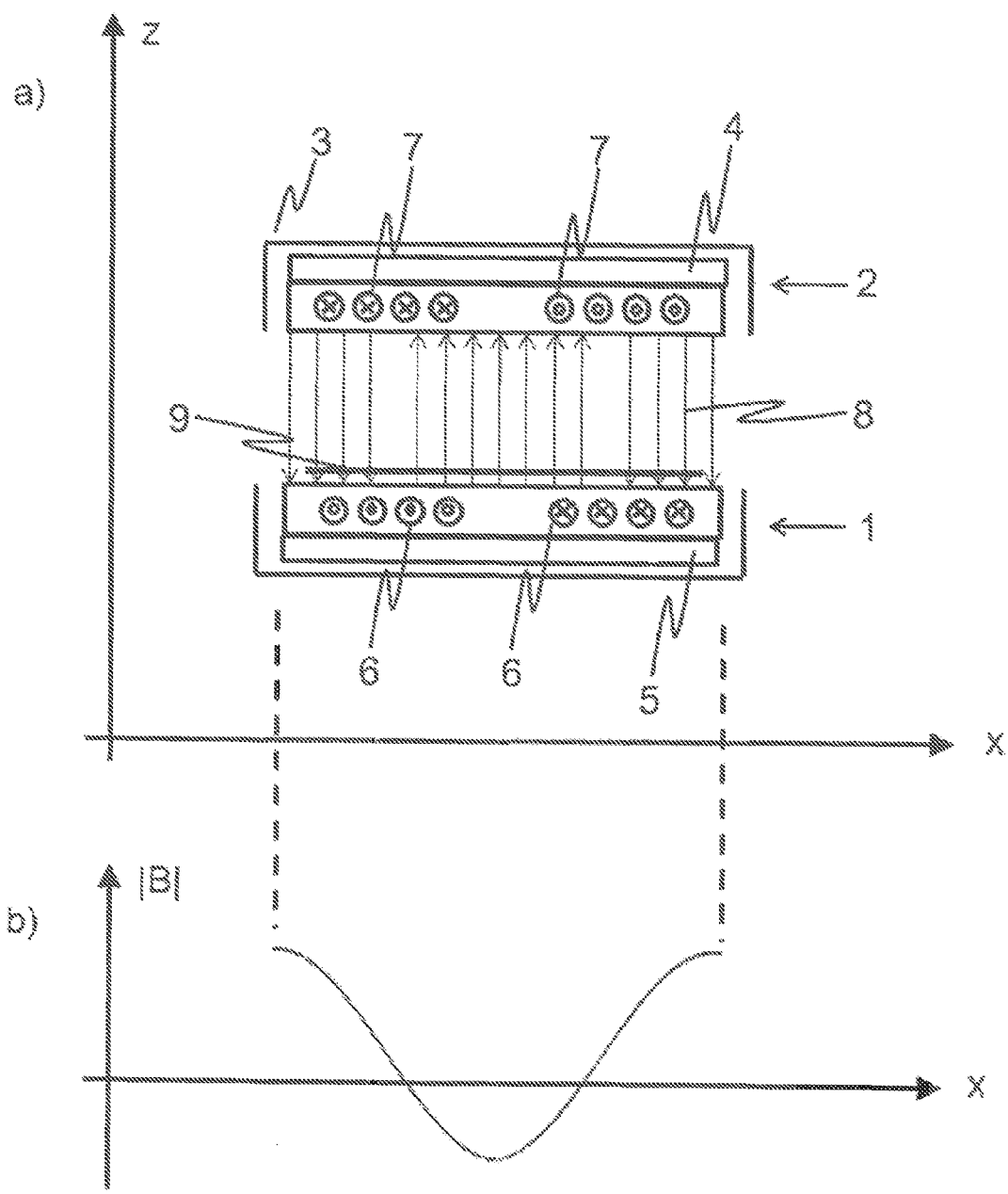
FIG. 1 schematically shows an apparatus for inductively transmitting power with a detector unit.

FIG. 1a shows an apparatus for inductively transmitting power. The apparatus is suitable, for example, for transmitting electrical power to a vehicle in order to charge, for instance, an energy store of the vehicle. The apparatus comprises a primary unit (1) with a primary coil (6) and a secondary unit (2) with a secondary coil (7).

The primary coil generates an alternating magnetic field at a transmission frequency, which field induces a voltage at the secondary coil according to the induction principle. This voltage can be used as the charging voltage in the vehicle. The alternating magnetic field is called the transmission field.

When the apparatus is used to inductively charge a vehicle energy store, the secondary unit can be integrated in the region of the underbody of the vehicle. The primary unit is situated outside the vehicle and can be integrated in a vehicle parking space and/or vehicle charging space, for example.

The vehicle can be charged when the vehicle is located in the region of the vehicle charging space in such a manner that sufficient spatial coverage of the secondary coil with the primary coil is established with respect to the x direction and the y direction. The x direction and the y direction moreover relate to the vehicle coordinate system which is known to a person skilled in the art, with the x axis along the direction of travel, the y axis transverse to the direction of travel and the z axis as the vehicle vertical axis. The transmission field is oriented along the z axis in the transmission area and is rotationally symmetrical with respect to the z axis in the exemplary embodiment shown.

During charging, the primary coil generates the transmission field (8) which may be rotationally symmetrical with respect to the z axis. The field area of the transmission field, which is situated between the primary unit and the secondary unit during charging, is called the transmission area.

Additional concentration of the transmission field in the transmission area can be achieved by respectively using two ferrites (4, 5) on that side of the primary or secondary coil which faces away from the transmission area in the z direction. The primary coil and the ferrite (4) are integrated in a first housing (1), and the secondary coil and the ferrite (5) are integrated in a second housing (2).

FIG. 1b shows the profile of the magnetic field strength along the x axis and when air or another medium which does not interact with the transmission field is situated in the transmission area. This state is referred to as the intended state.

Figure 2:
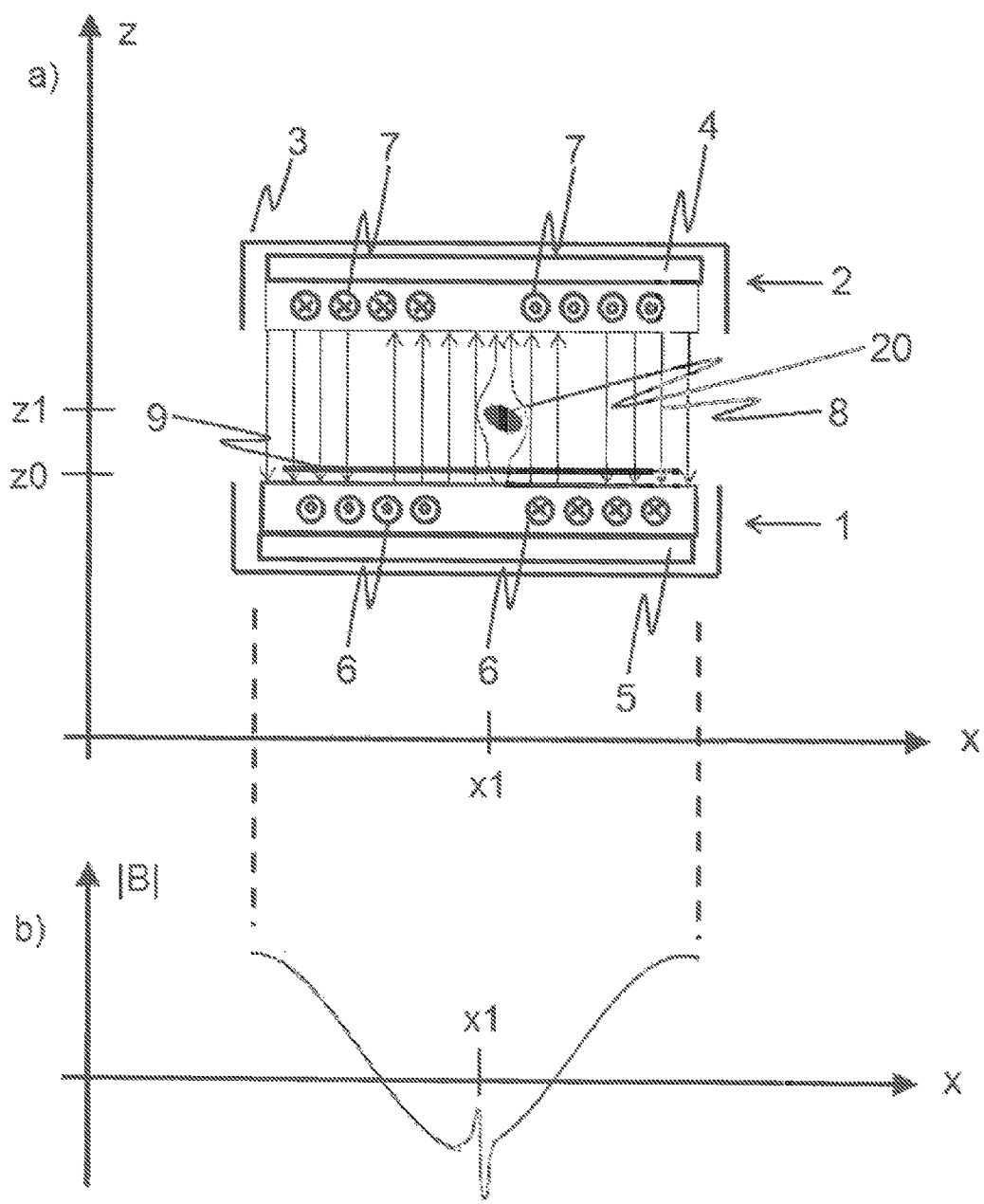
FIG. 2 schematically shows an apparatus for inductively transmitting power with a detector unit and a metal object.

FIG. 2a shows the apparatus, according to FIG. 1a, with a metal object in the transmission area at the location (x1, y1, z1). If an object which interacts with the transmission field, for example a piece of metal or, without restricting generality, a coin, is situated in the transmission area, the transmission field is locally changed in the region of the coin and in areas adjacent to the coin. The skin effect means that, eddy currents in the metal object displace the transmission field from its interior in which the eddy currents always induce a magnetic field opposite the transmission field in the interior of the metal object, which is called the opposing field. The opposing field is superimposed on the transmission field. The transmission field also has interference outside the metal object. According to FIG. 2b, the magnetic field is also locally inhomogeneous in the transmission area at the location (x1, y1, z1).

Figure 3:
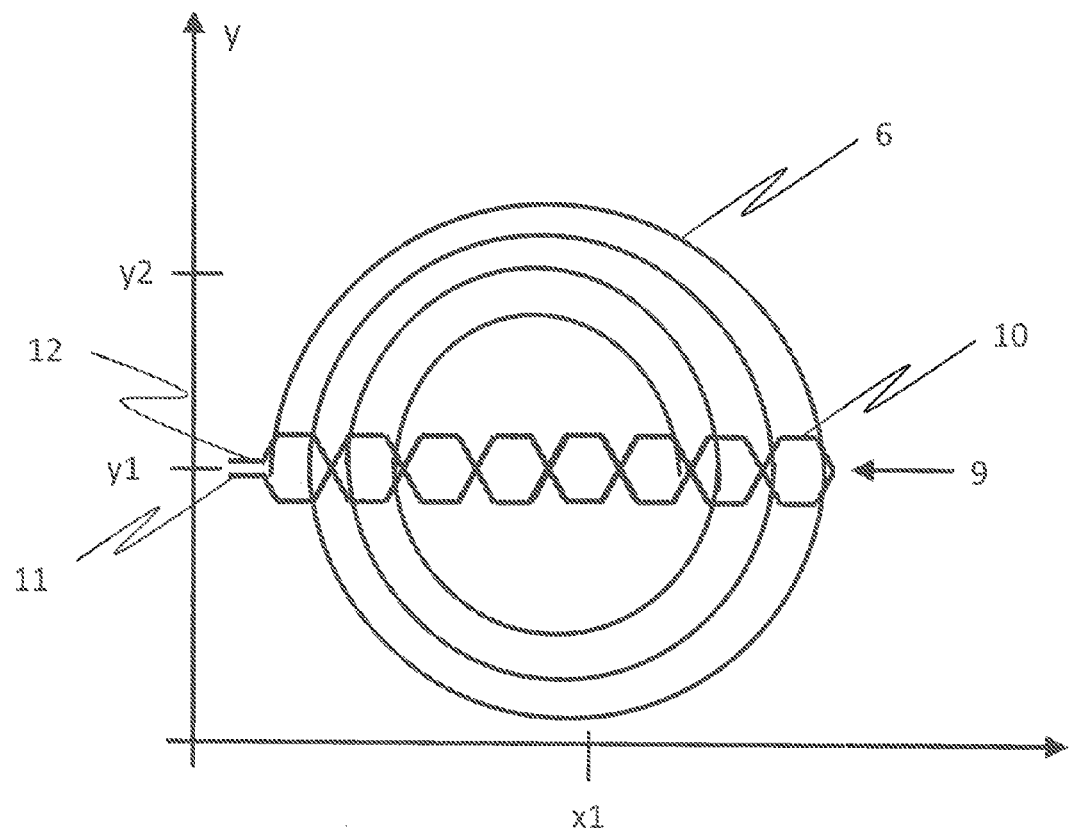
FIG. 3 schematically shows a view of a detector unit from the z direction.

FIG. 3 shows an embodiment of a detector unit (9) which can be used to detect a metal object situated in the transmission area.

The detector unit consists of an even number of coils (10). This exemplary embodiment describes eight coil segments without restricting generality.

Two coils of the detector unit are respectively wound in opposite directions in pairs and form a coil pair which electrically forms a series circuit. The detector unit in FIG. 3 therefore consists of four coil pairs which likewise form an electrical series circuit. A tap for the potential (11, 12) dropped across this series circuit is situated at one end of the detector unit. A measuring means is set up to measure the potential dropped across the tap and can additionally comprise the tap. Furthermore, data can be communicated between the measuring means and a control and/or regulation and/or evaluation unit of the inductive charger, which is referred to as a monitoring unit.

If the detector unit according to FIG. 3 is permeated by the magnetic field according to FIG. 1b, a voltage is induced in each coil. These voltages induced by the two coils of a coil pair have opposite polarity on account of the fact that said coils are wound in opposite directions, resulting at least in partial compensation for the induced voltages. The voltage which can be tapped off at the detector unit is low in this case.

If a metal object is situated in the transmission area, for example a coin which falls into the transmission area, an eddy current field caused by the eddy currents in the coin results in the transmission field being added to the eddy current field. This results in local interference in the magnetic field in the transmission area in the comparison between FIG. 1b and FIG. 2b in the area surrounding the coin with respect to all three spatial directions. FIG. 2b shows the changed magnetic field profile along the detector unit.

The local change in the magnetic field with respect to the x axis at the location x1 results in a change the induced voltage those coils which are situated in the region of the location x1 with respect to the x axis. Since the eddy current field causes a heterogeneous local change in the magnetic field in the transmission area, the voltage compensation by pairs of adjacent coils in FIG. 2b is of worse quality than in FIG. 1b. The voltage which can be tapped off at the detector unit is increased in this case in comparison with FIG. 1b. In particular, a heterogeneous local change in the field has an effect along the z axis in an area, with the result that, given a particular magnitude of the change, this change can also be detected in the plane (9). Therefore, a detection limit of the detector unit results on the basis of the magnitude of the transmission area along the z axis and the magnitude of the local change. This detection limit can be adapted to given requirements by configuring and locating the detector unit in the transmission area.

In this manner, a state which differs from the intended state can therefore be detected using the voltage which can be tapped off at the detector unit by means of a voltage comparison. For this purpose, the voltage value according to FIG. 1b can be permanently assigned to the apparatus as a reference voltage, and, during a charging operation, the voltage (detector voltage) which can be tapped off at the detector unit can be compared with the voltage value according to FIG. 1b. Such a comparison can be carried out by the monitoring unit.

In order to avoid heating of the metal object, a charging operation can be terminated by the monitoring unit if the detector voltage differs from the reference voltage.

According to another embodiment, the detector unit is constructed from an even number of coil segments, two adjacent coil segments each being wound in opposite directions. This can be carried out, for example, with a plait-like winding of the coil elements or with a winding in the form of an eight. Other forms of winding are also possible, which result in two coil segments of the detector unit, each being symmetrical with respect to the y direction and the x direction.

In particular, the detector unit is sensitive to metal objects having a spatial extent of the order of magnitude of the diameter of a coil or a coil segment. According to another embodiment, the detector unit has a mechanism which can be used to change the spatial extent of the coils or the coil segments. This is associated with the advantage that the sensitivity of the detector unit to different particle sizes can be adapted.

According to another embodiment, the apparatus has a plurality of detector units which are arranged beside one another with respect to the y axis, the result that the entire transmission area is covered by detector units in the x-y plane. A reference voltage can be assigned to each detector unit and the detector voltage is compared with the reference voltage for each detector unit. If the two voltage values differ in a detector unit, the charging operation can be terminated. Local differences can also be detected by differences in induced voltages between adjacent detector units. Induced voltages in the detector units, which are produced, for example, by positioning of the primary coil with respect to the secondary coil which is not entirely accurate, result in extensive effects without differences in induced voltages between adjacent detector units. The charging operation can then be continued even though the individual detector units have differences between the detector voltage and the reference voltage.

According to another embodiment, the detector unit is movable in the y direction. Therefore, the entire transmission area "can be searched" for small metal particles in the transmission area, in particular. A detector voltage profile can then be measured on the basis of the position of the detector unit with respect to the y axis (detector voltage profile). For example, a local change in the magnetic field at the location (x1, y2) can also be detected in this manner according to FIG. 3. In the exemplary embodiment shown, on account of the orientation of the transmission field which is rotationally symmetrical with respect to the z axis, the change in the voltage dropped across the tap during movement of the detector unit in the case of an undisturbed magnetic field in the transmission area is minor in comparison with the change in the voltage when a metal object is detected. The voltage profile at the tap on the basis of the position of the detector unit with respect to the y axis can additionally be permanently assigned to the apparatus as a reference voltage profile and the reference voltage profile can be compared with the detector voltage profile.

What is claimed is:

1. An apparatus for inductively transmitting power, comprising:
    a primary unit with a primary coil;
    a secondary unit with a secondary coil, wherein the primary coil induces a magnetic transmission field in a transmission area between the primary unit and the secondary unit, and
    at least one detector unit positioned in the transmission area and configured to detect an induction voltage, the at least one detector unit comprising an even number of detector coil elements wound in opposite directions such that adjacent detector coil elements form detector pairs.

2. The apparatus as claimed in claim 1, wherein
    the detector pairs are electrically connected to one another in at least one series circuit,
    the at least one series circuit forms the at least one detector unit,
    at least one measuring means for measuring the induction voltage at the detector unit is assigned to the at least one detector unit, and
    the at least one detector unit can be introduced or has been introduced into the transmission area.

3. The apparatus as claimed in claim 2, wherein
    the at least one detector unit is de-energized or the induction voltage is low in the case of a homogeneous transmission field, and
    the induction voltage is increased at the at least one detector unit in the case of an inhomogeneous transmission field.

4. The apparatus as claimed claim 1, wherein
    the at least one detector unit can be moved within a movement range perpendicular to the orientation of the transmission field in the transmission area, and
    the movement range covers the transmission area.

5. The apparatus as claimed claim 2, wherein
    the at least one detector unit can be moved within a movement range perpendicular to the orientation of the transmission field in the transmission area, and
    the movement range covers the transmission area.

6. The apparatus as claimed claim 3, wherein
    the at least one detector unit can be moved within a movement range perpendicular to the orientation of the transmission field in the transmission area, and
    the movement range covers the transmission area.

7. The apparatus as claimed in one of claim 1, wherein the apparatus comprises a plurality of detector units in the transmission area, and the detector units cover the entire transmission area in a manner perpendicular to the orientation of the transmission field.

8. The apparatus as claimed in one of claim 2, wherein the apparatus comprises a plurality of detector units in the transmission area, and the detector units cover the entire transmission area in a manner perpendicular to the orientation of the transmission field.

9. The apparatus as claimed in one of claim 3, wherein the apparatus comprises a plurality of detector units in the transmission area, and the detector units cover the entire transmission area in a manner perpendicular to the orientation of the transmission field.

10. The apparatus as claimed in one of claim 4, wherein the apparatus comprises a plurality of detector units in the transmission area, and the detector units cover the entire transmission area in a manner perpendicular to the orientation of the transmission field.

11. The apparatus as claimed in claim 1, wherein the spatial extent of a detector coil element is adjustable.

12. A system for inductively transmitting power to a vehicle, the system comprising the apparatus of claim 1 and the vehicle, wherein:
the secondary unit is included in the vehicle and is situated in the region of the underbody of the vehicle,
the primary unit is situated outside the vehicle, and
the at least one detector unit is included in the primary unit or the secondary unit.

13. The system as claimed in claim 12, wherein,
the detector pairs are electrically connected to one another in at least one series circuit,
the at least one series circuit forms the at least one detector unit,
at least one measuring means for measuring the induction voltage at the detector unit is assigned to the at least one detector unit, and
the at least one detector unit can be introduced or has been introduced into the transmission area.

14. The system as claimed in claim 13, wherein,
the at least one detector unit is de-energized or the induction voltage is low in the case of a homogeneous transmission field, and
the induction voltage is increased at the at least one detector unit in the case of an inhomogeneous transmission field.

15. The system as claimed in claim 12, wherein,
the at least one detector unit can be moved within a movement range perpendicular to the orientation of the transmission field in the transmission area, and
the movement range covers the transmission area.

16. The system as claimed in claim 12, wherein the apparatus comprises a plurality of detector units in the transmission area, and the detector units cover the entire transmission area in a manner perpendicular to the orientation of the transmission field.

17. The system as claimed in claim 12, wherein the spatial extent of a detector coil element is adjustable.

* * * * *